United States Patent
Schreurs et al.

(10) Patent No.: US 7,269,497 B2
(45) Date of Patent: Sep. 11, 2007

(54) METHOD AND DEVICE FOR ENGINE CONTROL IN A MOTOR VEHICLE

(75) Inventors: Bart Hubert Schreurs, Athus (BE); Julien Schmitt, Yutz (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/264,467

(22) Filed: Nov. 1, 2005

(65) Prior Publication Data

US 2006/0136116 A1 Jun. 22, 2006

(30) Foreign Application Priority Data

Dec. 17, 2004 (DE) .................. 10 2004 061 453

(51) Int. Cl.
*F02M 25/07* (2006.01)
*F02B 47/08* (2006.01)
*G06F 19/00* (2006.01)

(52) U.S. Cl. .................. 701/108; 123/568.21
(58) Field of Classification Search .......... 123/295, 123/305, 478, 480, 568.11, 568.21–568.3, 123/672, 698; 701/101–106, 108, 110, 111, 701/115
See application file for complete search history.

(56) References Cited

U.S. PATENT DOCUMENTS

| | | | |
|---|---|---|---|
| 5,918,582 A | 7/1999 | Itoyama | |
| 6,256,575 B1 * | 7/2001 | Sans | 701/102 |
| 6,499,469 B2 * | 12/2002 | Ogawa et al. | 123/478 |
| 6,557,525 B2 * | 5/2003 | Ogawa et al. | 123/295 |
| 6,631,704 B2 * | 10/2003 | Ogawa et al. | 123/295 |
| 6,705,303 B2 * | 3/2004 | Itoyama et al. | 123/568.21 |
| 2004/0250803 A1 * | 12/2004 | Kitamura et al. | 123/568.31 |

FOREIGN PATENT DOCUMENTS

| | | |
|---|---|---|
| DE | 10153322 A1 | 7/2002 |
| EP | 0964142 A | 12/1999 |
| JP | 07269416 A | 10/1995 |
| JP | 2002138907 A | 5/2002 |

OTHER PUBLICATIONS

EP 05 25 1626 Search Report dated Aug. 25, 2005.

* cited by examiner

*Primary Examiner*—Willis R. Wolfe, Jr.
(74) *Attorney, Agent, or Firm*—Paul L. Marshall

(57) ABSTRACT

A method for engine control in a motor vehicle is specified, in particular a method for controlling a combustion engine in a motor vehicle, namely for optimally adjusting a quantity of exhaust gas, which is recirculated, in an exhaust gas recirculation branch, from an exhaust manifold situated after the engine on the output side to an intake manifold situated before the engine on the input side, and a device functioning according to the method, which enables controlling and, where applicable, regulation of the recirculated exhaust gas quantity, whereby the regulation, in a preferred embodiment of the invention, is supplemented with possibilities for parameter adaptation.

Figure 1:
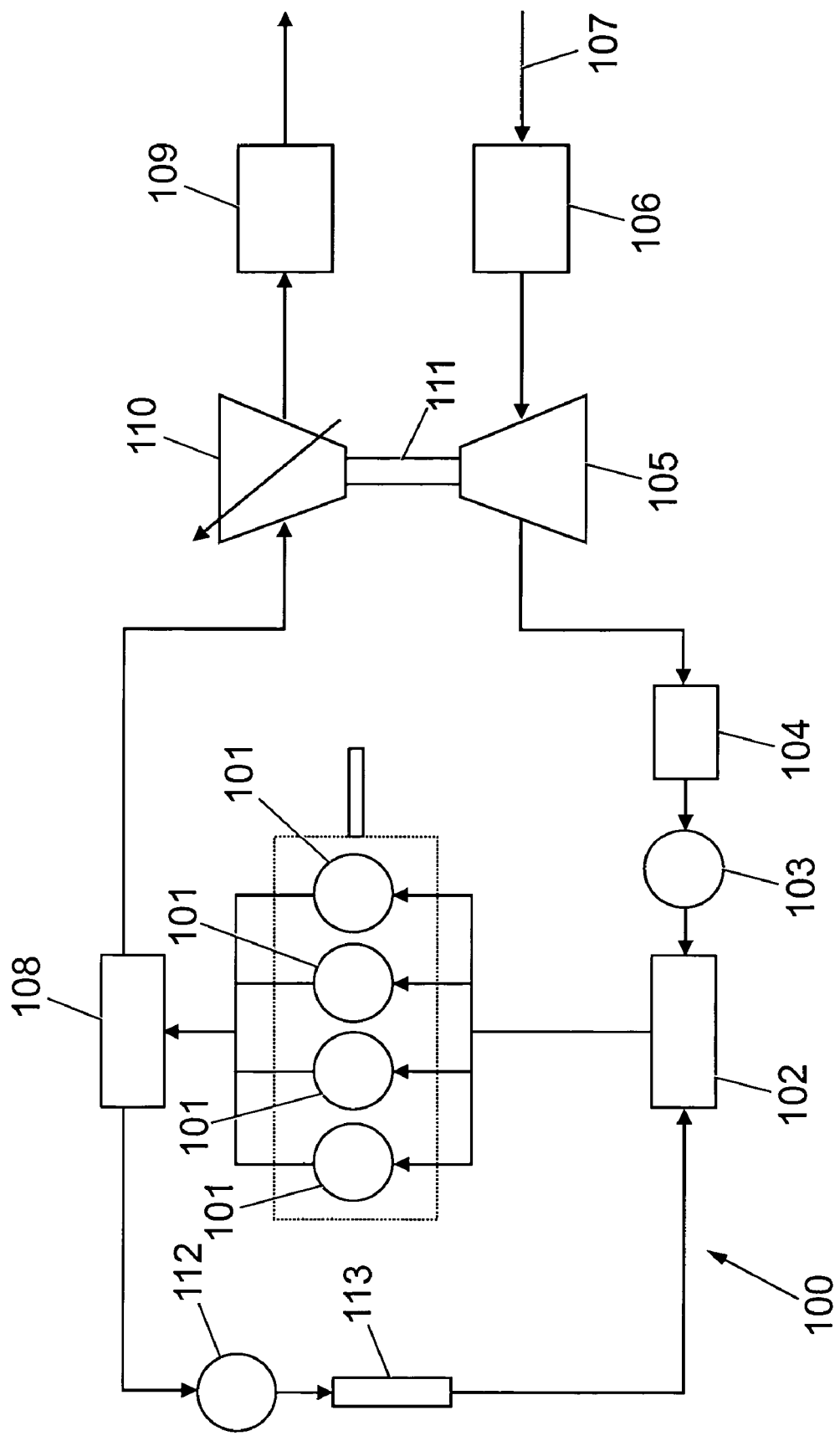

10 Claims, 5 Drawing Sheets ns are given the same reference numbers in
METHOD AND DEVICE FOR ENGINE CONTROL IN A MOTOR VEHICLE The invention relates to a method for engine control and a device functioning according to the method, e.g. engine electronics in which the method is implemented. In particular, the method relates to a regulation of the air/fuel mixture (Air/Fuel Ratio=AFR) and, with regard to the air proportion, to a regulation of the exhaust gas proportion in the air mass fed to the engine.

Exhaust gas recirculation as such is known and is also succinctly referred to in technical literature by the acronym EGR. Exhaust gas recirculation lowers, in a known manner, the combustion temperature, which leads, in a desired manner, to a reduction in the nitrogen proportion (NOx) in the combustion exhaust gas.

The invention consists in specifying a method for regulating exhaust gas recirculation, by means of which method it becomes possible for the first time to recirculate exhaust gas in the range of the maximum possible quantity. This brings about a maximum possible NOx reduction. Up until now, a recirculation of the theoretically known maximum possible exhaust gas quantity has not been possible, because, with the recirculation of higher exhaust gas quantities than has been usual up until now, the danger exists that, with the thus resulting air/fuel mixture, a conformation arises in the engine, whereby the combustion is no longer optimal or complete or does not proceed in the manner envisaged and thus, overall, a suboptimal or even a critical operating situation might occur. According to the invention, exhaust gas recirculation occurs as a result of controlling or regulation. Controlling enables a considerably improved recirculation of exhaust gas quantities in relation to known embodiments. The extent of the improvement is such that, already with the controlling, an exhaust gas quantity corresponding to the maximum possible recirculatable exhaust gas quantity or at least being in the range of the maximum possible recirculatable exhaust gas quantity is always recirculated. Regulation further improves these results and also enables an adaptation to altered operating states, e.g., as a result of deposits and the like in the area of the valve which regulates the recirculated exhaust gas quantity.

Regulation enables to always recirculate an exhaust gas quantity into the engine which corresponds to the maximum possible recirculatable exhaust gas quantity or at least is in the range of the maximum possible recirculatable exhaust gas quantity.

The above objectives are achieved, according to the invention by means of a method having the features of claim 1. With regard to the device, the objectives are achieved by means of a device functioning according to the method, e.g., an engine control, in which the method is electronically implemented, as software or in a hybrid form, i.e., partially electronically and partially in software.

The dependent claims concern preferred embodiments of the present invention and individual aspects of the invention and preferred embodiments thereof.

An embodiment of the invention and further preferred embodiments will be described below in greater detail with reference to the accompanying drawing. Corresponding objects or elements are given the same reference numbers in all figures.

In the drawing

Figure 2:
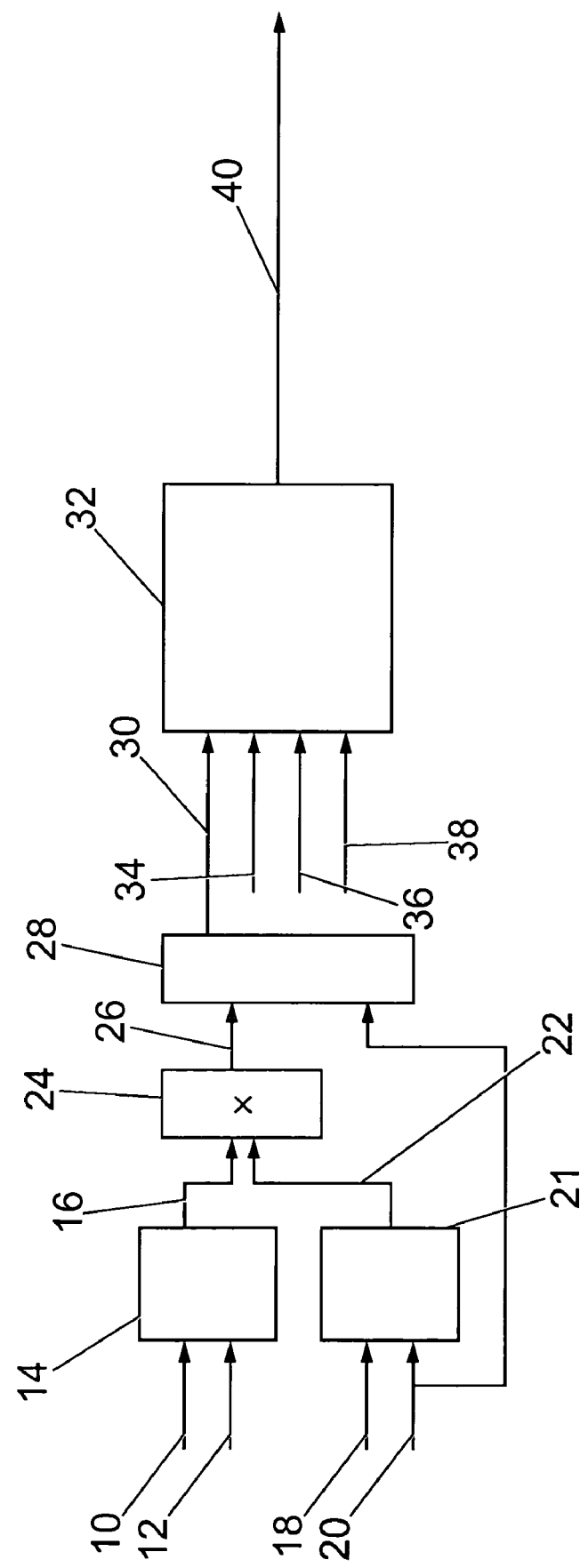
Figure 3:
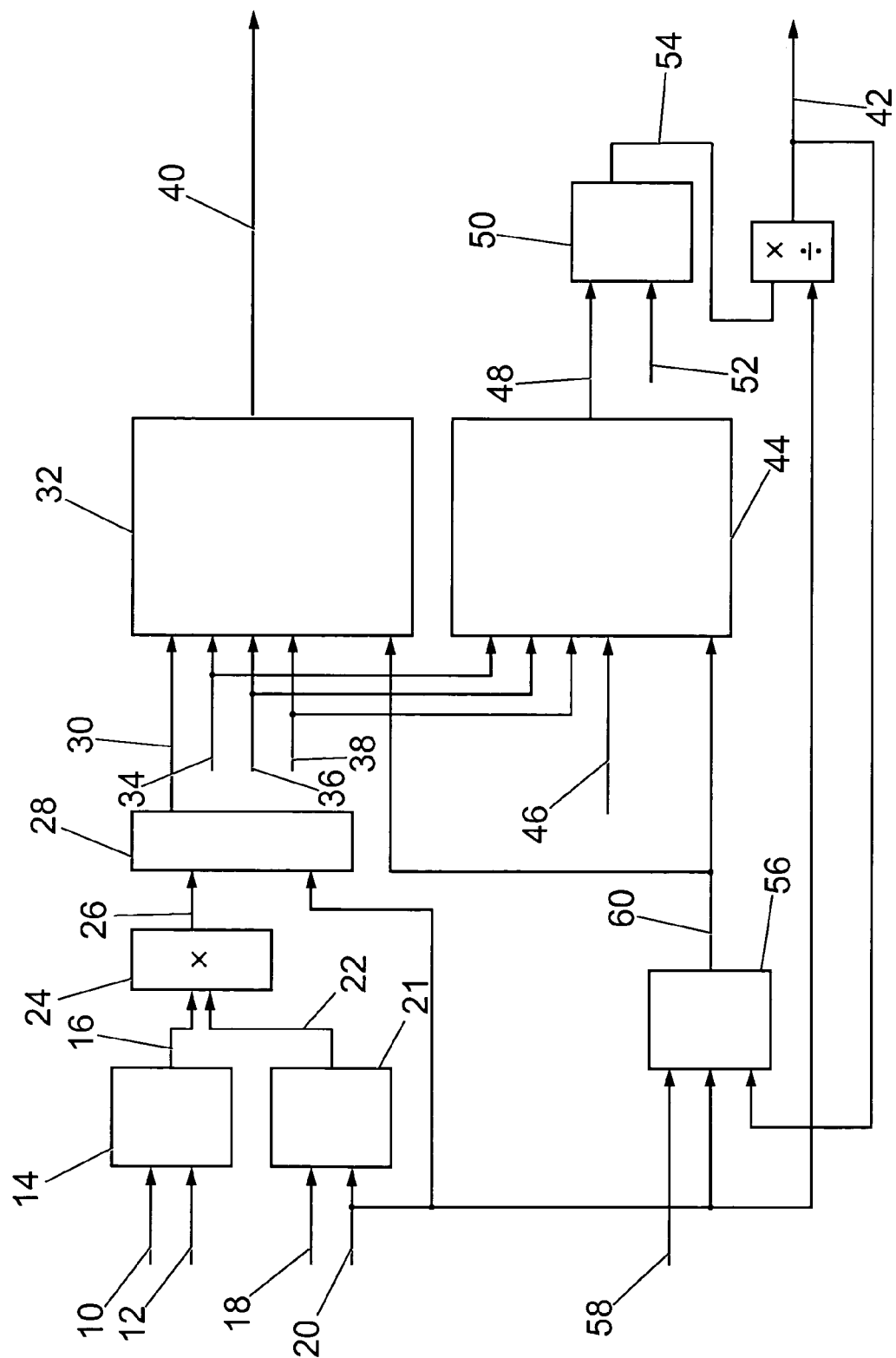
Figure 4:
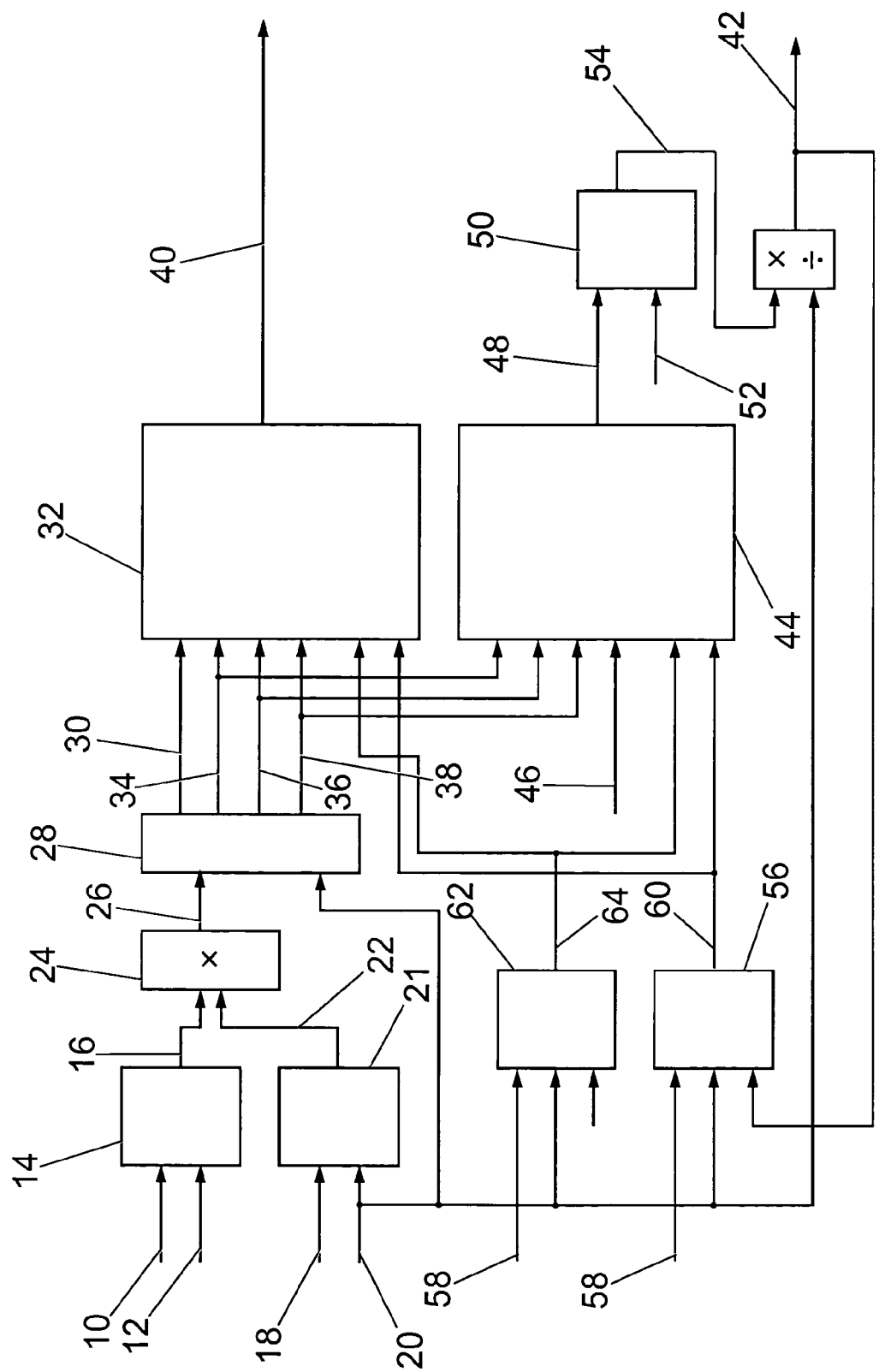
Figure 5:
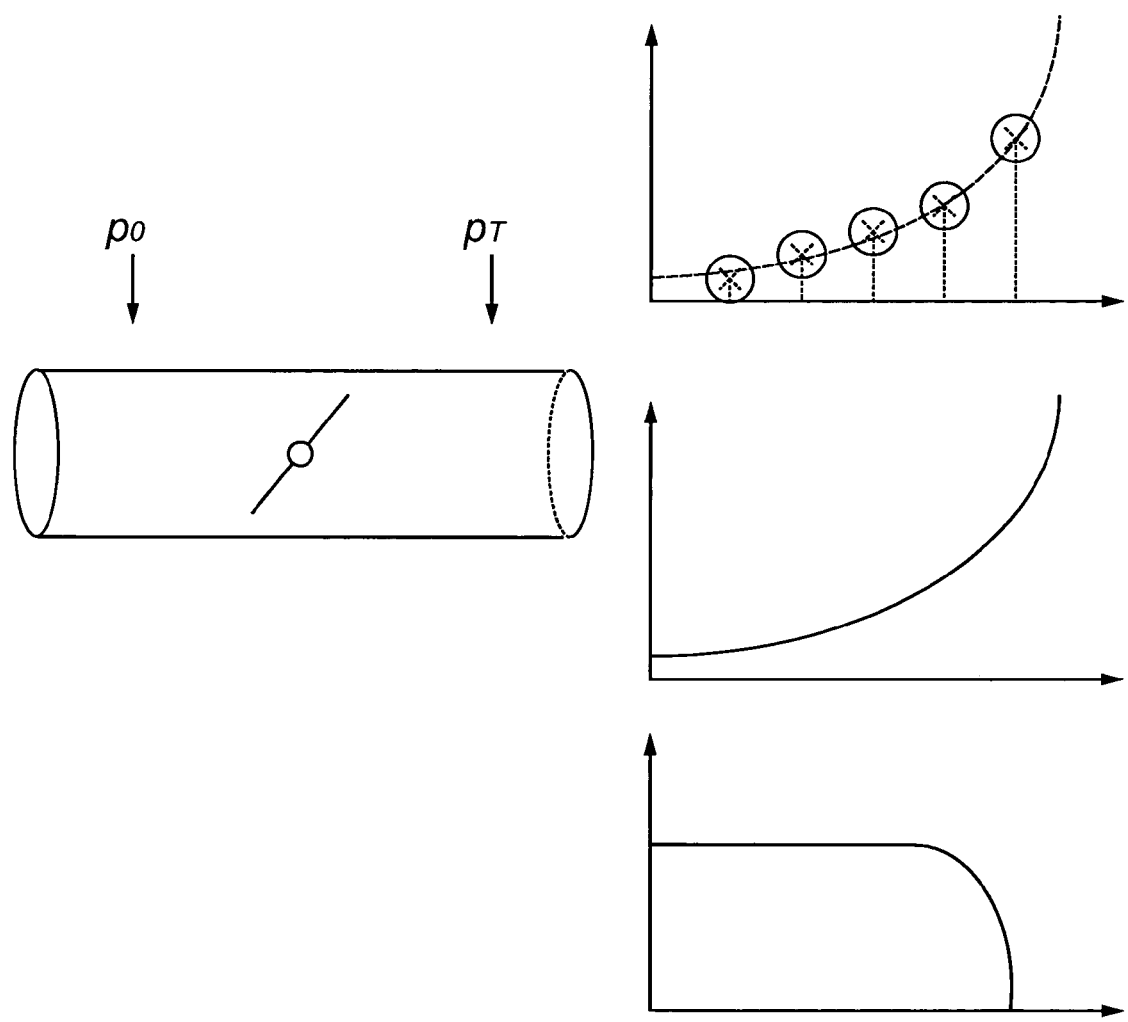

FIG. 1 is a schematically simplified block diagram of a combustion engine,

FIG. 2 is a schematically simplified block diagram of the control method according to the invention, FIG. 3 is a schematically simplified block diagram of a first embodiment of the regulation method according to the invention, FIG. 4 is a schematically simplified block diagram of a further embodiment of the regulation method according to the invention, and FIG. 5 is a simplified representation of a valve and characteristic curves associated with such a valve.

FIG. 1 shows a schematically simplified block diagram of a combustion engine 100, considering, as an example, a diesel motor, whereby the engine block is represented only by four schematically indicated cylinders 101.

An intake manifold 102, a throttle 103 and an inter-cooler 104 are situated upstream before the engine block in the direction of the mass flow. A compressor 105 and an air filter 106 are attached thereto. A fresh-air inlet 107 is located at the input of the air filter 106. Correspondingly, an exhaust manifold 108 and also a turbine in the direction of the exhaust line 109, particularly a turbine with variable geometry 110 (VGT=variable geometry turbine), which is driven by the exhaust gas and is connected with the compressor 105, e.g. via a common shaft 111 for driving it, is situated downstream after the engine block. For exhaust gas recirculation, at least a part of the exhaust gas from the exhaust manifold 108 can be recirculated via an EGR valve 112 (EGR=exhaust gas recirculation) and an EGR cooler 113 to the intake manifold 102 and thus into the engine.

The invention suggests a method for regulating the position of the EGR valve 112, such that an optimal exhaust gas quantity is always recirculated to the engine. The method is explained in the following with reference to FIG. 2.

FIG. 2 shows a schematically simplified block diagram of the control method according to the invention. A first and a second reading or input value of the regulation is denoted by 10 and 12, whereby the first input value 10 is a measurement for the speed of the engine, i.e., e.g. an engine speed 10, and the second input value 12 is a measurement for the power output, i.e., e.g. a torque 12. These two input values 10, 12 are suitably linked, e.g. using a lookup-table 14, so that, at the output of the lookup-table 14, a desired exhaust gas recirculation ratio 16 can be obtained. Particularly, a minimum air/fuel ratio 18, which is or can be preset as a constant, and a speed density 20 (unit: [g/s]) of the mass flow in or at the engine-side output of the intake manifold 102, are considered as further input values 18, 20 of the regulation. Mass flow in this case means the total mass flow, i.e., the mass flow of the mixture of fresh air and recirculated exhaust gas flowing through the intake manifold 102. By suitable mathematical operation, a maximum exhaust gas recirculation ratio 22 is calculated in a limit value calculation 21 from the minimum air/fuel ratio 18 and the speed density 20.

A limiter 24 is provided to limit, where applicable, the desired exhaust gas ratio 16 to the previously established maximum exhaust gas recirculation ratio 22. In the following, the desired or maximum exhaust gas ratio 16, 22 is succinctly denoted as DEGRR 16 (desired exhaust gas recirculation rate) or MEGR 22 (max exhaust gas recirculation rate). At the output of the limiter 24 an LDEGRR 26 (limited desired exhaust gas recirculation rate) can be obtained as a percentage value, where applicable, as a result of a suitable standardisation. In a subsequent multiplier 28, the limited desired exhaust gas recirculation ratio LDEGRR 26 is multiplied by the speed density 20. The result (the output of the multiplier 28) is the desired EGR mass flow 30 in [g/s].

The desired EGR mass flow 30 is fed to a model for the EGR valve 112—EGR valve model 32—as an input, which model is based substantially on the relationships specified subsequently, which are, in turn, based on the fact that a valve can be represented as a constriction in a pipe with an opening, where the width of the constriction is of a different size according to the opening state of the valve.

$$\dot{m} = \frac{C_D \cdot A_R \cdot p_0}{(R \cdot T_0)^{1/2}} \left(\frac{p_T}{p_0}\right)^{1/\gamma} \left\{\frac{2\gamma}{\gamma-1}\left[1 - \left(\frac{p_T}{p_0}\right)^{(\gamma-1)/\gamma}\right]\right\}^{1/2}$$

$$\dot{m} = \frac{C_D \cdot A_R \cdot p_0}{(R \cdot T_0)^{1/2}} \gamma^{(1/2)} \left(\frac{2}{\gamma+1}\right)^{(\gamma+1)/2(\gamma-1)}$$

It is known that flowing fluids in the area of such a constriction, flow at the speed of sound under certain conditions. The formula below thus relates to ratios in respect of flow speeds in the area of the valve opening below the speed of sound, if $$p_T/p_0 \leq [2/(\gamma+1)]^{\gamma/(\gamma-1)}; \quad [2/(\gamma+1)]^{\gamma/(\gamma-1)} \approx 0.52.$$

The upper of the two formulae relates to flows at the speed of sound in the area of the valve opening ("sonic flow").

A schematic representation relating to these ratios known per se is shown in FIG. 5. Therein, on the left-hand side, a simple model of a valve, namely a rotatable flap in a pipe section, is shown. The valve model forms the basis for the modeling of the EGR valve 112. The flap forms a resistance for a medium which flows through the pipe, i.e., e.g. the recirculated exhaust gas, due to which resistance the pressures in front of the flap (pressure $p_0$), viewed in the flow direction, and behind the flap (pressure $p_T$) are different. Depending on the pressure ratio in front of and behind the flap, there results a local flow speed in the area of the flap, which can reach the speed of sound, but cannot usually go beyond it. These ratios are shown schematically in a very much simplified manner on the right-hand side of FIG. 5, in the lower of the three co-ordinate systems. Therein, the pressure ratio is plotted on the abscissa and the flow speed is plotted on the ordinate. An area with a maximum flow speed can be identified, in which the flow speed is, actually, approximately constant. Here, the flow speed is in the area of the speed of sound (sonic area). The graph represented is a characteristic curve for a valve. The "sonic" area of the characteristic curve is described by the lower of the two previously specified formulae. The subsequent area of the characteristic curve, in which the flow speed is dependent on the pressure ratio in a non-linear manner and in which the flow speed remains below the speed of sound, is described by the upper of the two previously specified formulae.

The characteristic curve shown in the lower of the three co-ordinate systems represented in FIG. 5 can be transformed into a characteristic curve, shown in the middle co-ordinate system, which is also schematically very much simplified. In the middle co-ordinate system, an opening position of the flap (of the valve)—starting from a "closed" position in the area of the source—is plotted on the abscissa and a respectively related speed density of the mass flow in [g/s] is plotted on the ordinate. Upon increased opening of the flap, the mass flow through the valve also increases. In the last, upper co-ordinate system, a possibility for storing the characteristic curve of a valve shown in the middle co-ordinate system is shown. In a software implementation of a valve model based on the above-specified relationships according to the formulae, it is actually frequently too laborious to continually carry out complex calculations, as they should be carried out according to these relationships. On the other hand, it can be more favourable to save the resulting characteristic curve itself and further, where applicable, only single nodes. If a suitably high number of nodes, with equidistant spacing, are selected, the progression of the nodes also describes the characteristic curve in a sufficiently exact manner. The characteristic curve can thus be saved as a progression of variate pairs, namely the position of the respective node and the amplitude at the respective position. Storing of the characteristic curve in the form of a progression of nodes is favourable in respect of an embodiment of the invention, which is concerned with a regulation of exhaust gas recirculation, more precisely, with an optimisation of the regulation by adaptation of the underlying model parameters. The model parameters are, however, in the described embodiment, exactly the respective amplitude values of the nodes, because the characteristic curve is used as the basis in the modeling of the EGR valve 112.

The first input of the EGR valve model 32, the EGR mass flow 30, corresponds to the term m in the formula. As further input values of the EGR valve model 32, an EGR temperature 34, which appears in the formula as $T_0$, a pressure reading from the input of the EGR valve 112—EGR input pressure 36—and a pressure reading from the output of the EGR valve 112—EGR output pressure 38—are considered, whereby the EGR input pressure 36 appears in the formula as $p_0$ and the EGR output pressure 38 appears in the formula as $p_T$.

Each valve, and therefore also the EGR valve 112, can be described using the above-mentioned formulae. A characteristic curve for each valve can be derived from the formulae, which maps different opening states on respective related mass flows, in [g/s]. Such characteristic curves are frequently similar to an e-function, so that it arises that a non-linear connection between the opening state and the resulting mass flow exists. According to a preferred embodiment of the invention, a suitable representation of such a characteristic curve characterising the EGR valve, e.g. in the form of a progression of nodes of the characteristic curve, is saved in the EGR valve model 32. For the desired EGR mass flow 30, a measurement for the related position of the EGR valve 112 can be established using the characteristic curve or using the node nearest to the numerical value of the desired EGR mass flow 30. The characteristic curve or the respective relevant node and, where applicable, also the input value of the desired mass flow 30 are suitably scaled with the further inputs 34, 36, 38. At the output of the EGR valve model 32 an EGR position signal 40 can be obtained, which can be used for driving the EGR valve 112. The method for controlling the position of the EGR valve 112 is thereby completed. As a result of the consideration of the mentioned input values 10, 12, 18, 20, 34, 36, 38, it is ensured that the EGR mass flow resulting from the established position of the EGR valve 112 concurs with the maximum possible recirculatable EGR mass flow or is at least in the close vicinity thereof.

In the following, the regulation of the position of the EGR valve according to the invention is described using FIG. 3.

FIG. 3 shows, based on the block diagram shown in FIG. 2, a schematically simplified block diagram of a first embodiment of the regulation method according to the invention. The regulation method is based on a calculation of an "actual" exhaust gas recirculation ratio 42. For this purpose, the EGR valve model 32 can be consulted, which model is employed in a second EGR valve model 44 in a "quasi inverse" manner, as is explained in the following. The second EGR valve model 44 has three inputs 34, 36, 38 in common with the EGR valve model 32. The EGR valve model 32 has, besides these inputs 34, 36, 38, the input 30 for the desired EGR mass flow 30 and the output 40 for the EGR position signal 40. The corresponding inputs and outputs are interchanged in the second EGR valve model 44. I.e., when feeding an input signal representing the current EGR position 46, the second EGR valve model 44 supplies an output representing the current EGR mass flow 48.

The current EGR mass flow 48 is fed to a filter 50, which is provided for modeling the dynamics of the intake manifold 102. The modeling relates to the dynamic processes in the filling of the intake manifold 102 with the air/fuel mixture, the mixing of the two gases themselves and the influence of pressure and/or temperature on the filling and/or mixing. A possible embodiment of such a filter is described in the professional article "Dynamic EGR Estimation for Production Engine Control" in 2001 in the publication for the SAE World Congress in Detroit, Mich., US, (SAE Technical Paper 2001-01-0553). In addition to the current EGR mass flow 48, a measurement for the intake manifold volume 52 is fed to the filter 50 as a further input value. The filter 50 then gives, at its output, a value for the intake manifold EGR mass flow 54. The EGR mass flow 54 in the intake manifold is subsequently divided by the total mass flow 20 in the intake manifold, such that the "actual" exhaust gas recirculation ratio 42 results.

The actual exhaust gas recirculation ratio 42 is fed, together with further inputs, to a controller 56, which is realised, in particular, as a PI controller 56. As further input values, the controller 56 processes an air quantity reading 58, which is recorded at the fresh air intake 107, and the speed density of the total mass flow 20. The controller 56 functions on the basis of an error, which results from the difference of the current EGR flow to the "actual" or calculated EGR flow, i.e., from the difference of the total mass flow 20 to the air quantity reading 58 on the one hand and of the product from the "actual" or calculated exhaust gas recirculation ratio 42 to the total mass flow 20 on the other hand. At the output of the controller 56, an adaptation factor 60 thereby results. The adaptation factor 60 is fed to both the EGR valve model 32 and the second EGR valve model 44 for its adaptation to the actual ratios. The adaptation factor 60 is used mutiplicatively or at least substantially multiplicatively for forming the respective output values 40, 48 of the EGR valve models 32, 44. The control loop is thus closed. The described regulation enables a quick adjustment of possible errors in the model formation in the EGR valve model 32.

FIG. 4 shows a schematically simplified block diagram of a further embodiment of the regulation method according to the invention. According to this, it is intended that the characteristic curve of the EGR valve 112 forming the basis of the EGR valve model 32 be adaptively altered. The characteristic curve or nodes of the characteristic curve are, during the regulation, adapted more and more closely to the actual conditions; the characteristic curve is "learned". For this purpose, an adaptation function block 62 is provided, which processes the same input signals 20, 58, 42 as the controller 56. The adaptation function block 62 issues an adaptation value 64, with which the characteristic curve of the EGR valve 112 can be adapted in the EGR valve models 32, 44, i.e., e.g. the value of the respective nodes can be suitably scaled. Through the thus totally effected adaptation of the EGR valve model 32, 44, it arises that the adaptation factor 60 issued by the controller 56 is usually close to "1.0".

The dynamics requirements of the controller 56 are thus minimal, particularly in the steady state.

Thus, regulation via the controller 56 can also be interpreted as "fast" regulation. A particularity of fast regulation is, however, that the regulation does not directly influence the output value, i.e., the EGR position signal 40, but the parameters of the EGR valve model 32 and, where applicable, both EGR valve models 32, 44 are directly influenced, and only as a result thereof, the real output value, the EGR position signal 40, is indirectly influenced. Additional or alternative regulation via the adaptation function block 62 is, in contrast to this, rather a slow regulation, which can, however, adapt the control loop as a whole to altering conditions, e.g. deposits at the EGR valve 112, such that an optimal result can be obtained with regard to exhaust gas recirculation over the whole life span of the combustion engine and its components and aggregates. Both forms of regulation can be used alternatively or in combination. The regulation is also basically independent of the underlying control functionality. I.e., the regulation according to the invention can also be used for regulating a control branch with a layout other than that described here.

In short, the invention can thus be represented as follows:

A method for engine control in a motor vehicle is specified, in particular a method for controlling a combustion engine—engine control—in a motor vehicle, namely for optimally adjusting a quantity of exhaust gas, which is recirculated, in an exhaust gas recirculation branch, from an exhaust manifold 108 situated after the engine on the output side to an intake manifold 102 situated before the engine on the input side, and a device functioning according to the method is specified, which enables controlling and, where applicable, regulation of the recirculated exhaust gas quantity, whereby the regulation, in a preferred embodiment of the invention, is supplemented with possibilities for parameter adaptation.

The invention claimed is:

1. A device for controlling a combustion engine in a motor vehicle, namely for optimally adjusting a quantity of exhaust gas, which is recirculated, in an exhaust gas recirculation branch, from an exhaust manifold situated after the engine on the output side to an intake manifold situated before then engine on the input side, wherein the device functions to position a valve arranged in the exhaust gas recirculation branch for optimally adjusting the quantity of recirculated exhaust gas, wherein the device calculates an actual exhaust gas recirculation ratio based on models, and wherein the calculated actual exhaust gas recirculation ratio is fed back to a controller for adapting the EGR valve model.

2. A method for engine control in a motor vehicle, in particular a method for controlling a combustion engine—engine control—in a motor vehicle, namely for optimally adjusting a quantity of exhaust gas, which is recirculated, in an exhaust gas recirculation branch, from an exhaust manifold situated after the engine on the output side to an intake manifold situated before the engine on the input side, characterized in that a position of a valve arranged in the exhaust gas recirculation branch is controlled, for optimally adjusting the quantity of recirculated exhaust gas, wherein the controlling is based on a set value, which is calculated from a measurement for the speed of the engine, in particular a number of revolutions of the engine, and from a measurement for the performance outputted by the engine, in particular a torque, wherein the desired exhaust gas recirculation ratio acting as the set value is limited to a maximum exhaust gas recirculation ratio in a limiter if this is required, and wherein said desired exhaust gas recirculation ratio results from a limit value calculation from a preset or presettable minimum air/fuel ratio and a speed density of the total mass flow through the intake manifold.

3. The method according to claim 2, wherein a desired recirculated exhaust gas quantity results from a limited desired exhaust gas recirculation ratio available at the output of a limiter, with which the desired exhaust gas recirculation ratio, where applicable, is limited to the maximum exhaust gas recirculation ratio, and the speed density of the total mass flow through the intake manifold, in particular through multiplication in a multiplier.

4. The method according to claim 3, wherein the desired EGR mass flow forms an input of a model of the EGR valve, and wherein, using the EGR valve model from the desired EGR mass flow, in particular from the desired EGR mass flow and one or more further input values, an EGR position signal for driving the EGR valve or for driving an actuator, which, for its part, drives or adjusts the EGR valve, is determined.

5. A method for engine control in a motor vehicle, in particular a method for controlling a combustion engine— engine control—in a motor vehicle, namely for optimally adjusting a quantity of exhaust gas, which is recirculated, in an exhaust gas recirculation branch, from an exhaust manifold situated after the engine on the output side to an intake manifold situated before the engine on the input side, characterized in that a position of a valve arranged in the exhaust gas recirculation branch is controlled, for optimally adjusting the quantity of recirculated exhaust gas, wherein the controlling is complete to become regulation by calculating an actual exhaust gas recirculation ratio, and in particular by calculating it based on models, and wherein the actual exhaust gas recirculation ratio is fed back via a controller for adapting the EGR valve model.

6. The method according to claim 5, wherein, in addition to the actual exhaust gas recirculation ratio, the speed density of the total mass flow through the intake manifold and an air quantity reading recorded at the fresh air inlet of the engine are also fed to the controller.

7. The method according to claim 6, wherein the actual exhaust gas recirculation ratio and, in particular, also the speed density of the total mass flow through the intake manifold and the air quantity reading are fed to an adaptation function block arranged parallel to the regulator, and wherein the adaptation function block, using these input values, issues an adaptation value, with which a characteristic curve of the EGR valve underlying the EGR valve models is adapted.

8. The method according to claim 5, wherein the calculation of the actual exhaust gas recirculation ratio is done by means of a filter, which is provided for modeling the dynamics of the intake manifold, and by means of a second EGR valve model, and wherein the actual exhaust gas recirculation ratio is also fed back via the controller to the second EGR valve model for the adaptation thereof.

9. The method according to claim 8, wherein the second EGR valve model corresponds to the EGR valve model, and wherein the second EGR valve model is used inversely in relation to the EGR valve model.

10. The method according to claim 8, wherein, in addition to a current EGR mass flow as an output of the second EGR valve model, a measurement for the volume of the intake manifold is fed to the filter as an input value.

* * * * *